United States Patent [19]

Kijima et al.

[11] 4,152,465

[45] May 1, 1979

[54] METHOD OF REMOVING OBJECTIONABLE FLAVORS AND ODORS FROM TEXTURED SOY PROTEIN

[75] Inventors: Atsushi Kijima, Yokosuka; Shigenobu Tozaki, Fujisawa; Masahiko Yamada, Yokosuka, all of Japan

[73] Assignee: Meiji Seika Kaisha, Ltd., Tokyo, Japan

[21] Appl. No.: 812,381

[22] Filed: Jul. 1, 1977

[30] Foreign Application Priority Data

Jul. 5, 1976 [JP] Japan ................................ 51-78927

[51] Int. Cl.² .............................. A23J 3/00; A23J 1/14
[52] U.S. Cl. ..................................... 426/455; 426/472; 426/486; 426/802
[58] Field of Search ............... 426/486, 634, 461, 452, 426/472, 507, 511, 520, 802, 656, 455

[56] References Cited

U.S. PATENT DOCUMENTS

| | | | |
|---|---|---|---|
| 1,194,495 | 8/1916 | Friedman | 426/473 |
| 1,509,076 | 9/1924 | Berczeller | 426/461 |
| 3,912,824 | 10/1975 | Spiel | 426/802 X |

FOREIGN PATENT DOCUMENTS

2339908  3/1975  Fed. Rep. of Germany ........... 426/486

OTHER PUBLICATIONS

Smith et al., Soybean Chemistry and Technology, vol. 1, Proteins; The AVI Pub. Co., Inc., Westport Conn. (1972), p. 312.

Bender; Dictionary of Nutrition & Food Technology, Archon Books, London, Butterworths (3rd Ed. 1968) p. 203.

*Primary Examiner*—Kenneth M. Schor
*Attorney, Agent, or Firm*—Haight & Huard

[57] ABSTRACT

Green beany flavors and odors characteristic of soybean can be removed to a satisfactory extent from a textured soy protein by a method comprising (i) the first step of treatment wherein the soy protein is retained at a temperature of from 80° to 145° C. for a suitable period of time while the water content of said soy protein is maintained at a predetermined value, and (ii) the second step of treatment wherein said moistened soy protein treated in the first step is kept in contact with a flow of superheated steam at a temperature of from 105° to 160° C.

5 Claims, 1 Drawing Figure

METHOD OF REMOVING OBJECTIONABLE FLAVORS AND ODORS FROM TEXTURED SOY PROTEIN

BACKGROUND OF THE INVENTION

1. Field of the Invention

This invention relates to a method of removing objectionable flavors and odors from a textured soy protein, wherein the deodorizing treatments may be effected in a relatively facile and economic way on a commercial scale.

2. Description of the Prior Art

Nowadays, the demand for soy protein material is growing in association with resource problems on protein foods. It is well known that a soy protein material retains objectionable "green beany" flavors and odors characteristic of soybean, which greatly presents a substantial block to the extension of applications and increase in consumption of the soy protein. Textured soy protein materials are usually shaped as granules or pellets and have been provided principally for use as substitutes for livestock meats. The textured soy protein materials may include those which have previously been processed in such a manner that the unpleasant flavor and ordor characteristic of soybean is at least partially eliminated therefrom. It is known, however, that many, commercially available products of the textured soy protein still reproduce so-called "green beany" flavors and odors to a considerable extent when heated in the conventional cooking procedures. Owing to this drawback, a considerable restriction is imposed on the conventional textured soy protein materials with respect to their extension of applications and increase in consumption.

Various methods have hitherto been proposed to remove the characteristic objectionable flavors and odors from the soybean proteins and various processed soybean products. Yet, there has been provided no satisfactory method for the removal of the objectionable odors which may be operated in an efficient and facile way on a commercial scale.

Under these circumstances, we have closely studied the removal of the characteristic flavors and odors from a textured soy protein and consequently established a practical method satisfactory for this purpose, on the basis of the following discoveries.

SUMMARY OF THE INVENTION

We have found that a textured soy protein material develops the green beany flavors and odors when the soy protein material is retained for an appropriate period of time at a temperature in the range of from 80° to 145° C. and under such a pressure that the water contained in the soy protein is prevented from boiling, while the water content of the soy protein is maintained in the range of from 10 to 75%. The mechanism of the development of the flavors and odors is assumed to be that the moisture in the soy proteins will act on the network structure of the textured protein and consequently the components which are potentially present in and are firmly bonded to the protein structure and which are causative of and responsible for the developed green beany flavors and odors will preferentially be released and liberated from the textured soy protein materials. In this way, even a textured soy protein which is bland or substantially bland in dried conditions will develop an appreciable beany flavors and odors, and a textured soy protein which initially has the characteristic beany flavors and odors to an extend will increase the intensity of the flavors and odors. However, if the odor-development treatment is continued for an extended period beyond an appropriate limit time, it will result in the development not only of the green beany flavors and odors but also of unpleasant odors and flavors including "astringent taste", "bitter taste" and "wet duster-like odor" which are less removable. Therefore, the treatment in question must be discontinued before the development of the unfavorable flavors and odors other than the beany odors is initiated.

If the flavors and odor-development treatment is carried out with a textured soy protein having an excessively high water content (though it cannot necessarily be decided whether the water content of the protein is excessive or not, as it varies depending upon the nature of the textured soy protein), then the texture of the soy protein can be dissolved or disintegrated and often the unpleasant flavors and odors such as "astringent taste" and "bitter taste" can be developed, with the elastic properties characteristic of the textured soy protein being reduced or lost. Thus, in order to preferentially liberate the components causative of the beany flavors and odors from the said textured soy protein with involving no liberation of the other unpleasant flavors and odors and in order to prevent the elastic properties of the soy proteins from being deteriorated, it has been found necessary to carry out the odor-development treatment at a water content of the textured soy protein maintained in the range of from 10 to 75% during the treatment and at an operating temperature selected in the range of 80° to 145° C. As far as some textured soy protein materials are concerned, a water content exceeding 60% may cause disintegration or dissolution of the texture in the course of the treatment, while a water content of lower than 30% may not ensure satisfactory odor-development. It is therefore recommendable to select the water content at a suitable level within the range of 10 to 75%, depending upon the nature of the textured soy protein material to be treated. Such suitable level of the water content can be determined by simple preliminary experiments. It has been found that the suitable level of the water content is generally in the range of 30 to 60% for any of the known textured soy protein materials.

We have further found that when the textured soy protein whose green beany flavors and odors have been developed by the treatment as stated above is allowed to stand for an appropriate period of time under a flow of superheated steam at a temperature of from 105° to 160° C. and at a substantially atmospheric pressure, then the water contained in the textured soy protein is vaporized off to reduce progressively the water content of the textured soy protein, during which the temperature within the textured soy protein material so treated is spontaneously kept at about 100° C. This results in a complete removal of the objectionable beany flavors and odors to the extent that the objectionable flavors and odors are not detectable by the organoleptic test. It is thus believed that in the course of the step where the water is vaporized off from the structure of the said textured soy protein placed under the superheated steam flow, the components responsible for the green beany flavors and odors are entrained effectively by the vaporized water in a mechanism similar to the principle of steam distillation and thus are evaporated off from the textured soy protein, resulting in complete elimination of the objectionable beany flavours and odors. The treatment in this step may be herein referred to as "superheated steam treatment". If the superheated steam at a temperature of 105° to 160° C. is replaced by dry air or a dry inert gas such as nitrogen at the same temperature to carry out said treatment, it leads to enhanced vaporization of the water and rapid consumption of heat from the textured soy protein due to an increased latent heat of vaporization, whereby the temperature of the soy textured protein is reduced to below 100° C. and as a consequence the deodorizing effect becomes less satisfactory than with the use of the superheated steam. The use of superheated steam at a temperature of higher than 160° C. will also result in no satisfactory deodorizing effect due to too rapid vaporization of the water.

Taking these into consideration, it may be understood that the superheated steam treatment would bring about the following effects:- Where the moistened textured soy protein which has been subjected to the previous odor-development treatment is kept in contact with a flow of the super heated steam at a temperature of 105° to 160° C. to vaporize the water out of the textured soy protein, an actually observed pressure of said super heated steam flow is not very much lower than the theoretical saturation pressure of the steam which should naturally prevail at said temperature, and hence the vaporization off of the water out of the textured soy protein slowly proceeds at a fairly controlled rate. For this reason and due to the elevated temperature of the textured soy protein, the vaporization of the water surely takes place throughout the whole interior of the soy protein material, whereby the components causative of the green beany flavors and odors are removed uniformly and thoroughly from all the portions of the textured soy protein material by being entrained with the vaporized water. In this way, the perfect removal of the objectionable beany odors can be achieved.

On the basis of our findings as stated above, we have get an inventive concept that the first step wherein the textured soy protein material is subjected to an odor-development treatment under the predetermined conditions can beneficially be combined with the second step wherein the odor-developed soy protein material is then subjected to a treatment analogous to the steam-distillation under the specific conditions; in spite of that the effect of said first step is apparently contradictory to our ultimate view to removing the objectionable flavors and odors from the textured soy protein material. By combination of the first and the second steps, we have succeeded in producing a substantially bland textured soy protein which does not reproduce the green beany flavors and odors characteristic of soy beans on a subsequent cooking and which retains the original elastic properties and the texture thereof.

DETAILED DESCRIPTION OF THE INVENTION

Figure 1:
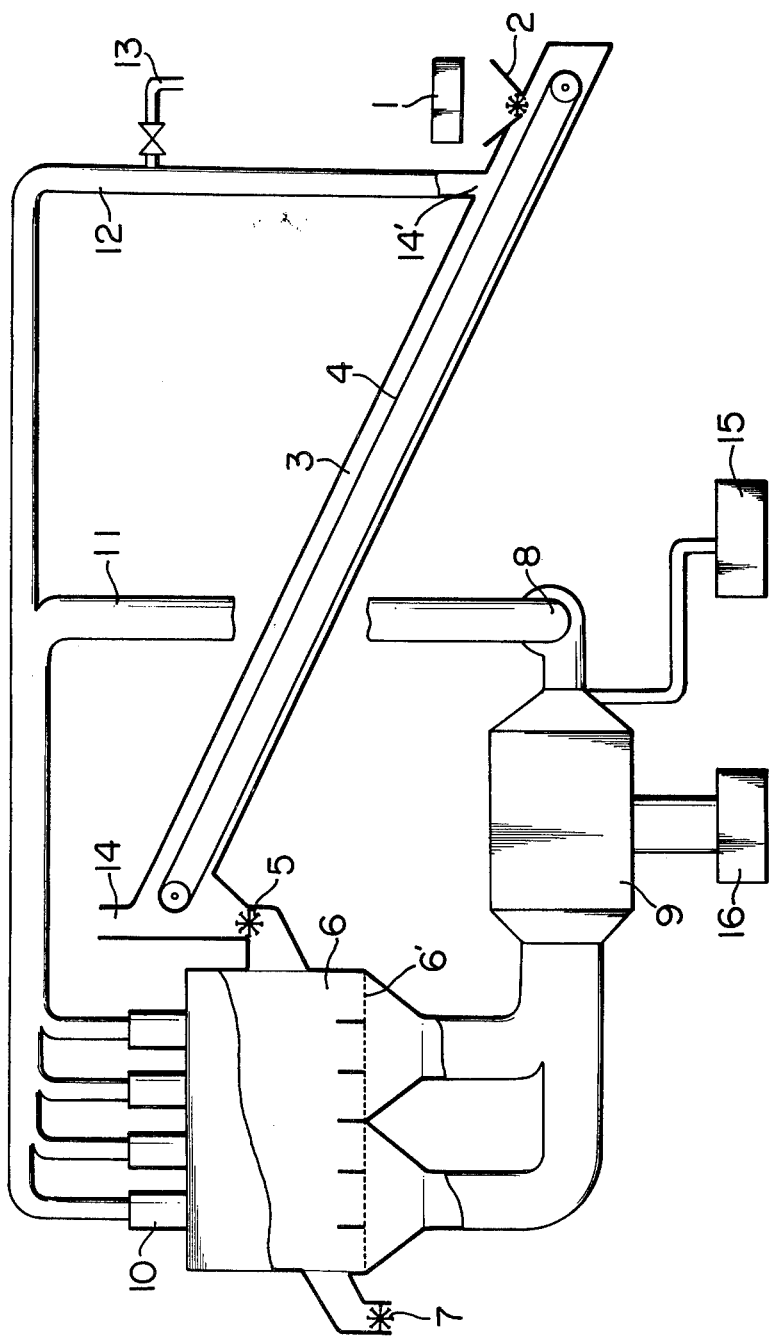

According to this invention, there is provided a method of removing objectionable flavors and odors from a textured soy protein which comprises (i) the step of odor-development treatment wherein the textured soy protein is retained at a temperature of 80° to 145° C. under such a pressure sufficiently high to prevent the water contained in the textured soy protein from boiling, while the water content of the textured soy protein is maintained at a predetermined level which is in the range of from 10 to 75% of the textured soy protein and at which neither disintegration nor dissolution of the texture of the protein is involved, said odor-development treatment being continued for a period of time which is long sufficiently for the components causative of the green beany flavors and odors characteristic of soybeans to be liberated from the structure of the soy protein and to develop the beany flavors and odors but which is short sufficiently for the other objectionable flavors and odors than the green beany flavors and odors to be prevented from being developed from the textured soy protein, and (ii) the subsequent step of superheated steam treatment wherein the moistened textured soy protein treated in the preceding step is kept in contact with a flow of superhheated steam at a temperature of 105° to 160° C. to vaporize the water out of the textured soy protein and to achieve concurrently the evaporation off of said liberated components causative of the green beany flavors and odors until the soy protein material have become bland.

Various methods are known for texturization of soy proteins. A typical one of the known texturizing methods is the thermoplastic extrusion process which comprises passing a mixture of a soy protein flour and water through a screw extruder in which said mixture is heated, kneaded and compressed by means of the rotating screw. When the mixture leaves the extruder, it expands so that a texture is imparted to the protein material. Another texturizing method is also such one in which a compressed, hot mixture of a soy protein and water is suddenly released from the pressure to achieve the expansion of the protein material. As the starting soy protein material to be textured, there may generally be used a soybean flour which is obtained from the defatted soybeans. Other starting soy protein materials include soy protein concentrates or purified soy proteins of a higher protein content which are obtained by purification of the defatted soybean flour as well as mixtures thereof with a defatted soybean flour.

The textured soy protein from which the objectionable flavors and odors are to be removed according to the present invention may be any of those having different compositions and having been produced by known various techniques. The textured soy proteins for present use preferably consist of pure deffatted soy flour, although they may contain conventional additives, for example, flavoring materials, modifiers for solid state properties, preservatives, oils, fats and carbohydrates, provided that these additives have no substantial adverse effect on the inherent properties of the textured soy protein in the steps of the present method.

In the first step of the present method, a hydrated textured soy protein is retained at a temperature of 80° to 145° C. to effect the odor-development. The water content of the soy protein should be maintained in the range of 10 to 75% of the textured soy protein. The water content maintained in this range is the amount of water necessary and sufficient not only to ensure that the water acts on the subtance of the textured soy protein as liquid-phase water at an elevated temperature to liberate therefrom the components causative of the characteristic beany flavors and odors, but also to ensure that the development of objectionable flavors and odors other than the green beany flavors and odors is prevented during the given period of time, and that the elastic characteristics and the cohesive texture of the textured soy protein are prevented from deterioration. A preferred value at which the water content should be maintained will vary to an extent, depending upon the nature of the textured soy protein to be treated. However, it can be readily determined within said range (10 to 75%) by simple preliminary experiments. In general, the preferred value of the water content falls within the range of 30 to 60%. When the water content of the textured soy protein to be treated is shorter than the required range of the water content, it is necessary to admix beforehand cold or hot water with the textured soy protein as uniformly as possible. The addition of the water must not be effected under so vigorous or long a mechanical agitation as to impair the elastic properties and the cohesive texture of the textured soy protein used.

In the first step of the present method, the moistened textured soy protein having a given water content is retained at a temperature of 80° to 145° C., preferably at about 100° C., as stated hereinbefore. For this purpose, it is possible to supply externally heat into a vessel containing the soy protein material. It is convenient, however, to blow steam at substantially atmospheric pressure directly into the vessel. In the latter case, it should be taken into consideration that as a certain amount of water condensate formed from the blown steam builds up in the body of the textured soy protein material to increase the water content thereof, this amount of the condensed water would provide a fraction of the water content of the textured soy protein which is needed according to the present method.

Duration of the odor-development treatment in the first step will depend on the nature and the water content of the textured soy protein to be treated as well as on the treatment temperature to be employed, although it may be generally in the range from 10 minutes to 2 hours if the treatment is carried out nearly at 100° C. As already mentioned, the treatment should be stopped before such a time is reached when the unfavorable odors and flavors other than the characteristic beany flavors and odors are developed from the soy proteins during the treatment. Before that time, neither disintegration nor dissolution of the texture of the textured soy protein will take place. A suitable duration of the treatment in any particular case can be easily determined by preliminary experiments.

In order to keep the textured soy protein at a temperature of from 80° to 145° C. in the first step, a container in which the textured soy protein is placed may be heated externally or a hot gas, for example, steam may be blown into the container. Alternatively, a belt conveyor may be provided in a tunnel-type chamber fitted with an inlet and an outlet, the textured soy protein is supplied through the inlet, placed on the moving belt conveyor and a hot gas, e.g. steam be passed into the chamber. In this way, the treatment of the first step may be operated continuously. The treatment of the first step may be carried out under atmospheric or superatmospheric pressure, as far as the pressure which the textured soy protein material being treated undergoes is sufficiently high to ensure that the water content in the protein material is prevented from boiling.

Most conveniently from a commercial standpoint, the treatment of the first step may be effected at the temperature of saturation of water vapor which prevails under atmospheric pressure, using steam as the heating medium. It is thus preferable to raise the soy protein to 100° C. by contacting with steam, and to operate the first step with retaining the protein nearly at 100° C. At an operating temperature exceeding 145° C., the treatment duration may be shortend but undesirable phenomena will take place including development of unpleasant odors and flavors (other than the green beany flavors and odors), coloring and decomposition of the textured soy protein. While, at a temperature of lower than 80° C. an extremely long duration is required to make the method inefficient.

The textured soy protein treated as described above in the first step is then subjected to the second step as such, with the textured soy protein kept in the moistened and odor-developed conditions. It is preferred that the textured soy protein treated in the first step should be directly passed to the second step without cooling.

In order to keep the textured soy protein in contact with a flow of superheated steam in the second step, a perforated plate or a net may be provided at the bottom or at an intermediate position of a vertical or inclined tower, the textured soy protein be placed as a build-up layer on the perforated plate or net, and a flow of superheated steam at a temperature of from 105° to 160° C. may be introduced into said tower to pass upwardly or downwardly by way of the apertures of the perforated plate or net in such a manner that the flow of superheated steam passes through the stationary build-up layer of the textured soy protein. Alternatively, the superheated steam treatment of the second step may be carried out in such a manner that a flow of superheated steam is passed upwardly at a higher velocity to fluidize the soy protein layer which is placed in the tower. Then, the flow of superheated steam may be passed at a velocity of about 0.5 to 30 m/sec. to make the textured soy protein layer fluidized.

The temperature of the superheated steam flow which is used in the second step may vary within the range of 105° to 160° C. The static pressure of the superheated steam flow may be substantially atmospheric in practice, although it may be somewhat lower or higher than atmospheric pressure, if desired. However, it is necessary that the pressure of the superheated steam flow employed in the second step of the present method should have a pressure of lower than the saturated vapor pressure of water which would prevail at the existing temperature of the superheated steam flow employed, as otherwise the superheated steam flow would not be capable of drying, that is, vaporizing the water out of the moistened soy protein material with which the superheated steam flow is contacting. The flow of superheated steam may contain a minor proportion of air but preferably consists of steam alone. Thus, the superheated steam treatment may be desirably carried out under an atmosphere substantially free from air or oxygen.

When the moistened textured soy protein is kept in contact with the superheated steam flow at a temperature of from 105° to 160° C. and passing continuously therethrough in the abovementioned manner, the soy protein reaches up to the saturation temperature of the saturated water vapor as will be formed under the prevailing pressure and is maintained at this temperature, if the superheated steam flow consists of steam alone. When an amount of air is present in the superheated steam flow, it follows that the textured soy protein is maintained at a temperature lower than said saturation temperature of the water vapor. However, a considerably small proportion or a trace of air present in the superheated steam flow has no influence on that the textured soy protein is maintained at the saturation temperature of the water vapor under the prevailing pressure. In consequence, when there is employed in the second step superheated steam flow (free from other gases) which has a static pressure of substantially atmospheric pressure, the temperature in the textured soy protein material is retained substantially at 100° C.

As the water content in the textured soy protein is reduced by vaporization in the course of the second step beyond a certain value, however, the temperature of the soy protein raises more and more closely to that of the superheated steam. The reason why the moistened textured soy protein which is kept in contact with the superheated steam flow is retained at or near the saturation temperature of the water vapor under the prevailing pressure is that the heat supplied by the superheated steam would be used up solely (or exclusively) for the vaporization of the water out of the soy protein which necessitates the latent heat of vaporization. It is belived that all and each of the granules of the moistened textured soy protein kept in contact with the superheated steam should show the same temperature uniformly throughout the whole interior of each granule, so that the vaporization of water would take place uniformly throughout the whole interior of each textured soy protein granule. The rate of the vaporization of the water out of the texture soy protein largely depends on the temperature and velocity of the superheated steam flow employed, while it also depends on the quantity of air or other gases present in the superheated steam flow. In particular, when the quantity of air or other non-condensable gas present in the superheated steam flow is substantially increased, the vaporization rate of the water is increased but the temperature of the textured soy protein themselves is decreased. It is therefore desirable that said quantity of air or other non-condensable gas is not more than 15%, preferably not more than 5% by volume and more preferably substantially zero% based on the superheated steam.

The presence of a larger quantity of air or other gas in the superheated steam flow can cause too rapid vaporization of the water from the textured soy protein and as a consequence the temperature of the textured soy proteins can be lowered below the saturation temperature of the water vapor which should prevail under the existing static pressure of the superheated steam flow. This can adversely affects on that the beany or-dor-giving components are removed effectively in the mechanism analogous to steam distillation, resulting in reduction of the deodorizing effect. Further, the oxygen present in the air may cause deterioration of the quality of the textured soy protein.

The flow of the superheated steam to be used in the second step should be at a temperature in the range of from 105° to 160° C. If the temperature is lower than 105° C., the vaporization of the water from the textured soy proteins is too slow, which necessitates a considerably prolonged treatment. On the other hand, if the temperature exceeds 160° C., the vaporization of the water will occur too rapidly, leading to the disadvantage as stated above, and possibly resulting in deterioration of the quality of the textured soy protein, as the temperature of the textured soy protein can too rapidly be increased after the water content has been reduced to a certain low value.

The superheated steam treatment in the second step is continued until the textured soy protein become organoleptically bland. Preferably, the treatment is continued until the water content of the soy protein treated has been reduced to approx. 20% or less, when the soy protein have become bland to such an extent that the green beany flavors and odors are no longer developed from the deodorized textured soy proteins by normal heating involved in the domestic cooking of the latter. The treatment duration to be required will depend on the various factors including the procedure to contact the textured soy protein with the superheated steam flow and the temperature, linear velocity of flow and flow rate of the superheated steam, as well as the nature and particle size of the textured soy protein employed, although it is generally within the range of from 1 to 60 minutes. If desired, the superheated steam treatment may be followed by additional drying which may be effected in a conventional manner to further dehydrate the textured soy protein up to a predetermined water content (e.g. 1–3%) as low as that of so-called "dry product".

In the accompanying drawing:

FIG. 1 shows in diagrammatic view a system suitable to carry out the method of this invention.

The invention is illustrated with reference to the accompanying drawing.

In the drawing, there is shown a mixer 1 for admixing cold or hot water with the textured soy protein to be deodorized. This mixer may be provided with a means for supply of water, for example, spray nozzle and a stirring means for ensuring uniform distribution of water supplied, for example, ribbon-shaped stirring wing or screw-type transfer stirrer. The mixer may be any known device by which a given amount of water is supplied and distributed as uniformly as feasible into the textured soy protein material and which is able to mix the moistend textured soy protein material to form a homogeneous mixture without exerting an intensive mechanical force on said mixture to disintegrate the cohesive texture of the textured soy protein.

The moistened textured soy protein material is transferred through hopper 2 onto conveyor belt 4 arranged in a tunnel-type heating chamber 3 for the odor-development. The hopper is provided at its lower part with a means capable of controlling the supply of the material and substantially blocking the external atmosphere from entering into the chamber, for example, rocker valve. The chamber 3 is equipped with an outlet 14 and inlet 14' for steam and with rocker valve 5. The moistened textured soy protein material is maintained at an elevated temperature by rapid heating during its transfer on the conveyor 4 in the heating chamber 3 in such a manner that the odor-development treatment is performed in the chamber 3.

The textured soy protein so treated in the first step is then introduced through the rocker valve 5 into chamber 6 for the superheated steam treatment where the textured soy protein material is built up as a layer on perforated plate 6' located at the bottom of the chamber. The chamber 6 is fitted with inlet and outlet for superheated steam flow. The built-up textured soy protein layer is contacted in fluidized state with the superheated steam flow by passing upwardly the latter through apertures of the foraminate plate 6'. In this way the water is vaporized off from the textured soy protein with elimination of the green beany flavors and odors therefrom, so that the second step of the present method is achieved. The substantially bland textured soy protein material thus treated in the second step is withdrawn from the rocker valve 7.

The steam flow is generated in boiler 15, superheated to a given temperature by means of heat exchanger 9 being heated by a pressure steam boiler or an oil-heating boiler 16, and introduced into the chamber 6 at its bottom. Within the chamber 6, the superheated steam flow is kept in contact with the fluidized layer of the textured soy protein to allow the vaporization of the water therefrom, whereby the superheated steam flow falls in temperature. After the completion of the treatment in the second step, the steam flow enters cyclone 10 mounted at the top of the chamber 6 (precisely cyclone dust collector), where fine particles of the soy protein materials entrained by the steam flow are separated therefrom and collected. The steam flow is then conducted via duct 11 to fan 8 where it is compressed and returned to the exchanger 9. The fan 8 may be any conventional one, for example, sirocco fan, propeller fan or turbo-fan. Thus, the superheated steam flow is passed for re-use through the closed recycle circuit comprising heat exchanger 9, chamber for superheated steam treatment 6, cyclone 10, duct 11 and fan 8, in such a way that the ambient air does not enter the chamber 6.

The water vapor evaporated from the moistened textured soy protein by the superheated steam treatment is associated with the superheated steam flow to make an excess of the steam, which is expelled by way of duct 12 branched from duct 11.

The duct 12 is connected to the inlet portion 14' of steam opening into the heating chamber 3 so that the steam expelled from the duct 11 can be utilized to raise and retain the temperature of the moistened textured soy protein on the conveyor 4 within the chamber 3. A still superfluous amount of the steam is evacuated from valve-fitted outlet pipe 13 provided on the way of the duct 12. In a case where a quantity of the superheated steam to be recycled to the chamber 6 is deficient or where the air originally present in the steam recycle circuit, particularly in the chamber 6 is purged or scavenged on start-up of the operation of the system, an additional or a fresh amount of superheated steam is replenished or supplied by running the steam boiler 15.

It is to be understood that this invention is in no way limited by the above descriptions with reference to the drawing and that a variety of modifications or alternations may be made without prejudice to this invention. As a modification, the conveyor 4 within the heating chamber 3 for odor-development may be replaced by a horizontal screwed drum provided with spiral threads. Instead of the chamber 6 containing the fluidized bed of the textured soy protein granules formed on the foraminate plate within the chamber 6, it is possible to employ a chamber containing a conveyor made of metal gauze on which the textured soy protein material is placed, or a tower chamber in which the textured soy proteins granules fall down successively from one to another movable baffle plates provided in said tower, or other suitable arrangements which enables good contact of the superheated steam flow with the textured soy protein.

This invention is further illustrated by the following Examples.

EXAMPLE 1

The staring material employed was 5 Kg of a commercially available textured soy protein having a protein content of 52% based on its dry weight, which had been produced from defatted soy flour by the thermoplastic extrusion process, and such type of textured soy protein normally had good water-absorption properties and showed a tendency to lose its elastic properties and its cohesive texture when it adsorbed an excess of water or was subjected to an external mechanical force after the water absorption. This textured soy protein material was admixed with 2.27 Kg of water to form a homogeneous mixture. The mixture was heated to a temperature of 100° C. by placing it in a stream of steam at 100° C. under atmospheric pressure, and the mixture was then retained at this temperature in the steam for 30 minutes to effect the odor-development from the textured soy protein. The water content of the textured soy protein material used, which was initially odorless, was 7% at start, 36% after the admixture with water and 41% after the above treatment with steam at 100° C. Due to this treatment with the steam, the soy protein material reproduced the green beany flavors and odors characteristic of soybean.

The textured soy protein material thus treated was immediately transferred into a tower provided at its bottom with a foraminate plate and was accumulated as a built-up layer on the plate. A flow of superheated steam at atmospheric pressure was passed upwardly into the built-up layer of the textured soy protein through the foraminate plate at a flow rate of about 10 $m^3/m^2$. sec. The superheated steam treatment was conducted at different temperatures of the steam indicated and for different periods of time indicated in Table 1 below.

The textured soy protein treated in the above manner had a water content reduced to 15% or less and subjected to organoleptics to check the flavors and odors of the textured soy protein. The organoleptics were carried out by ten skilled panel members. The results of the replicate tests are set out in Table 1 below.

Table 1

| Test No. | Temperature of Superheated steam | Superheated steam treatment duration | Green beany flavors and odors | Other objectionable flavors and odors |
| --- | --- | --- | --- | --- |
| 1 - 1 | 103° C. | 2h. | No detectable by all panel members | Astringent taste perceived by all members and wet duster-like odor by four members |
| 1 - 2 | 105° C. | 2h. | " | Any objectionable flavors and odor not detectable by all members |
| 1 - 3 | 105° C. | 1h. | " | " |
| 1 - 4 | 120° C. | 15min. | " | " |
| 1 - 5 | 140° C. | 7.5min. | " | " |
| 1 - 6 | 160° C. | 4min. | " | " |
| 1 - 7 | 160° C. | 4.5min. | " | " |
| 1 - 8 | 170° C. | 4min. | Gaseous prussic acid-like odor perceived by all | Smell of baked soybeans, although not objectionable, perceived by all members |

Table 1-continued

| Test No. | Temperature of Superheated steam | Superheated steam treatment duration | Green beany flavors and odors | Other objectionable flavors and odors |
|---|---|---|---|---|
| | | | members | |

EXAMPLE 2

The starting material used was a commercially available textured soy protein having a protein content of 70% based on its dry weight, which was one produced from defatted soy flour by the thermoplastic extrusion process and which was able to absorb a considerable amount of water at a relatively slow rate and less liable to lose its elastic properties and the cohesive texture by external mechanical force even after the water absorption. From this textured soy protein material, there were prepared samples having different water contents by drying at low temperatures or by addition of water. These samples were heated to a temperature of 100° C. by means of steam at 100° C. under atmospheric pressure and retained at this temperature for periods of time indicated in Table 2 to effect the odor-development. In any case, the samples placed in the steam at 100° C. rose in temperature nearly to 100° C. within a very short period of time.

The soy protein samples were then subjected to the treatment with superheated steam at 130° C. and at atmospheric pressure for 10 minutes in the same manner as described in Example 1, followed by organoleptics in the same way as in Example 1. The particulars of the test and the organoleptic results are listed in Table 2 below.

Table 2

| Test No. | Conditioning of sample | Water content before odor-development treatment | Water content one minute after initiation of the treatment | Water content at the end of the treatment | Treatment duration | Result |
|---|---|---|---|---|---|---|
| 2 - 1 | Drying at low temperature | 3% | 7% | 7% | 30min. | Green beany flavors and odor perceived by all panel members |
| 2 - 2 | " | 3% | 7% | 7% | 2h. | " |
| 2 - 3 | " | 5% | 9% | 9% | 30min. | " |
| 2 - 4 | " | 5% | 9% | 9% | 2h. | " |
| 2 - 5 | No drying | 7% | 11.5% | 11.5% | 30min. | Beany odor perceived by only one member |
| 2 - 6 | No drying | 7% | 11.5% | 11.5% | 2h. | No green beany flavors and odor detectable by all members |
| 2 - 7 | Addition of water (4 parts per 100 parts of textured soy protein) | 10.5% | 15% | 15% | 30min. | " |
| 2 - 8 | Same as 2-7 except 24 parts of water added | 25% | 30% | 30% | 30min. | " |
| 2 - 9 | Same as 2-7 except 70 parts of water added | 45% | 50% | 50% | 30min. | " |
| 2 - 10 | Same as 2-7 except 232 parts of water added | 72% | 75% | 75% | 30min. | " |
| 2 - 11 | Same as 2-7 except 304 parts of water added | 77% | 79.5% | 79.5% | 30min. | No green beany odor detectable by all members but astringent taste perceived by seven members and bitter taste by two; Difficult to form fluidized bed and mechanical agitation required |

EXAMPLE 3

For three samples of textured soy protein, that is, the same one as used in Example 1 (denoted as Sample A), the same one as used in Example 2 (denoted as Sample B) and one available as import products (denoted as Sample C) (the last Sample C having a protein content of 52% based on its dry weight and a smaller specific volume and better water absorption properties over Samples A and B and having a greater tendency to lose the cohesive texture properties by the water absorption over Sample A), some preliminary experiments were conducted to determine the level of the water content which was suitable to carry out the first and the second steps according to the present method. Samples A–C were then subjected to the treatments under the working conditions shown in Table 3 below. The heating and maintenance of the elevated temperature of the sample in the first step was achieved by placing the sample in an atmosphere of saturated water vapor under atmospheric pressure when the sample was raised to 100° C., by placing the sample within a closed vessel located in a constant temperature oil bath when the sample was raised to below 100° C.; and by placing the sample within a closed vessel located in a hydromatic sterilizer when the sample was raised to above 100° C.

The samples of the textured soy proteins thus treated were subjected to organoleptics in the same manner as stated in Example 1. All the panel members estimated that the samples tested were all free from the green beany flavors and odors, astringent taste and bitter taste.

products treated as above were judged by all the panel members to be free from the green beany flavors and odors as well as other unpleasant odors and flavors (astringent taste, bitter taste etc.).

EXAMPLE 4 (For comparison)

By way of comparison, the same textured soy proteins as used in Example 1 were subjected to some comparative tests for the deodorizing treatments which Table 3

| Test No. | Test sample | First step | | | Second Step | |
|---|---|---|---|---|---|---|
| | | Water content at the end of this step | Temperature of sample maintained | Treatment duration | Temperature of superheated steam | Treatment duration |
| 3-1 | Sample A | 40% | 80° C. | 3days | 130° C. | 10min. |
| 3-2 | Sample A | 40% | 90° C. | 6h. | 130° C. | 10min. |
| 3-3 | Sample A | 40% | 100° C. | 30min. | 130° C. | 10min. |
| 3-4 | Sample A | 40% | 145° C. | Short* | 130° C. | 10min. |
| 3-5 | Sample A | 20% | 100° C. | 1h. | 110° C. | 12min. |
| 3-6 | Sample A | 66% | 100° C. | 10min. | 160° C. | 15min. |
| 3-7 | Sample B | 30% | 100° C. | 1h. | 115° C. | 13min. |
| 3-8 | Sample B | 50% | 100° C. | 30min. | 145° C. | 10min. |
| 3-9 | Sample B | 75% | 100° C. | 30min. | 160° C. | 22min. |
| 3-10 | Sample C | 10% | 100° C. | 3h. | 105° C. | 12min. |
| 3-11 | Sample C | 30% | 100° C. | 1h. | 110° C. | 20min. |
| 3-12 | Sample C | 60% | 100° C. | 30min. | 130° C. | 15min. |

*Heated within a closed vessel placed in a pressurized water bath and cooled immediately after the sample in the closed vessel reached 145° C.

The organoleptics described in Examples 1-3 were conducted with the speciemens which were obtained by pouring an amount of hot water in the deodorized textured soy protein products of the second step and allowing the products to adsorb the water. For further organoleptics, the deodorized textured soy protein products were conducted by the procedures and under the conditions set forth in Table 4. The textured soy protein products obtained in these comparative tests were estimated by the same organoleptics as mentioned in Examples 1 to 3. The results are summarized in Table 4 below.

Table 4

| Test No. | Procedure of deodorizing treatment in comparative tests | Result |
|---|---|---|
| 4-1 | Four times repetition of the two succesive steps of immersion of the textured soy protein sample in a sufficient volume of hot water for 3 minutes and draining, followed by a final freeze-drying. | Taste of raw soybeans and bitter taste perceived by all panel members and astringent taste by five members; Textures damaged heavily; Yield 50% |
| 4-2 | Cooking of the textured soy protein sample in boiling water for 30 minutes, draining and then freeze-drying. | Taste of raw soybeans perceived by all panel members, bitter taste by eight members, astringent taste by five and wet duster-like odor by three; Textures damaged seriously; Yield 48% |
| 4-3 | Moistening of the textured soy protein sample to 50% water content, forced passage of steam at 100° C. for one hour and then drying in fluidized state with hot air at 80° C. | Green beany flavor and odor perceived by nine members, raw and astringent tastes by four and bitter taste by three. |
| 4-4 | Moistening of the textured soy protein sample to 50% water content and drying in air under a reduced pressure to 20-200 mmHg | Green beany flavor and odor perceived by all panel members |
| 4-5 | Moistening of the textured soy protein sample to 50% water content and drying in fluidized bed in hot air at 100° C. under atmospheric pressure | Cyanic acid-like flavor and odor of baked soybeans perceived by all panel members. |
| 4-6 | Same as Tests 4-5 except the drying at 70° C. | Green beany flavor and odor perceived by nine panel members. |
| 4-7 | Sample as Test 4-5 except the drying at 60° C. | Green beany flavor and odor perceived by all panel members. | obtained by test Nos. 1-2 to 1-7 of Example 1, Nos. 2-5 to 2-10 of Example 2 and Nos. 2-9 and 2-10 of Example 3 were treated by adding thereto a two-fold quantity of water based on the weight of the textured soy proteins (such quantity of water added being conventionally used in normal cooking), and allowing all the water to be adsorbed by the textured soy protein product, followed by thermal treatment in usual autoclave at 120° C. The result was that all these textured soy protein

What we claim is:

1. A method for removing objectionable flavors and odors from a textured soy protein, which comprises:
   (i) heating the textured soy protein at a temperature of 80°-145° C. under a pressure sufficiently high to prevent the water contained in the textured soy protein from boiling, while the water content of the textured soy protein is maintained at a predetermined level in the range of 10–75% by weight of the texturized soy protein and at which neither disintegration nor dissolving of the texture of the protein takes place, said heating being continued for a period of time which is sufficiently long to develop the green beany flavors and odors characteristic of soybeans such that said beany flavors and odors are liberated from the textured soy protein but which heating period is sufficiently short to prevent objectionable astringent and bitter flavors and wet, dusty-like odors from being developed from the textured soy protein; and (ii) contacting the moistened textured soy protein treated in the preceding step with a continuously passing flow of superheated steam having a temperature of 105°–160° C. and having a static pressure lower than the saturated vapor pressure of water which would prevail at the existing temperature of the superheated flow employed, whereby the soy protein is retained at about 100° C. throughout the steaming, and the water is vaporized out of the textured soy protein with concurrent evaporation off of the components which cause the green beany flavors and odors, said contacting being continued until the soy protein material no longer shows said detectable green beany flavors and odors.

2. A method according to claim 1, in which the superheated steam flow is passed through a stationary build-up layer of the granules of a textured soy protein.

3. A method according to claim 1, in which a layer of the granules of the textured soy protein is substantially fluidized by means of the superheated steam flow which passes through said layer.

4. A method according to claim 1, in which the superheated steam treatment is continued until the water content of the soy protein is reduced to 20% or less.

5. A method of removing objectionable flavors and odors from a textured soy protein, which comprises:

(i) maintaining the textured soy protein at a temperature of about 100° C. under a pressure sufficiently high to prevent the water contained in the textured soy protein from boiling, while the water content of the textured soy protein is maintained at a predetermined level which is in the range of from 10 to 75% by weight of the textured soy protein and at which neither disintegration nor dissolving of the texture of the protein is involved, said treatment being continued for a period of time which is in the range of 10 minutes to 3 hours and is sufficiently long to cause the green beany flavors and odors characteristic of soybeans to be liberated from the textured soy protein but which heating period is sufficiently short to prevent the objectionable astringent and bitter flavors and wet, dusty-like odors other than the green beany flavors and odors from being developed from the textured soy protein, and (ii) continuously contacting the moistened textured soy protein treated in the preceding step with a continuously passing flow of superheated steam having a temperature of 105°–160° C. and having a static pressure substantially equal to atmospheric pressure, whereby the soy protein is retained at about 100° C. throughout the steaming, and the water is vaporized out of the textured soy protein with concurrent evaporation off of the components which cause the green beany flavors and odors, said contacting being continued until the soy protein material no longer shows detectable green beany flavors and odors.

* * * * *